May 21, 1963  H. R. BRANNON, JR  3,090,866
SPECTROMETER
Filed June 3, 1957
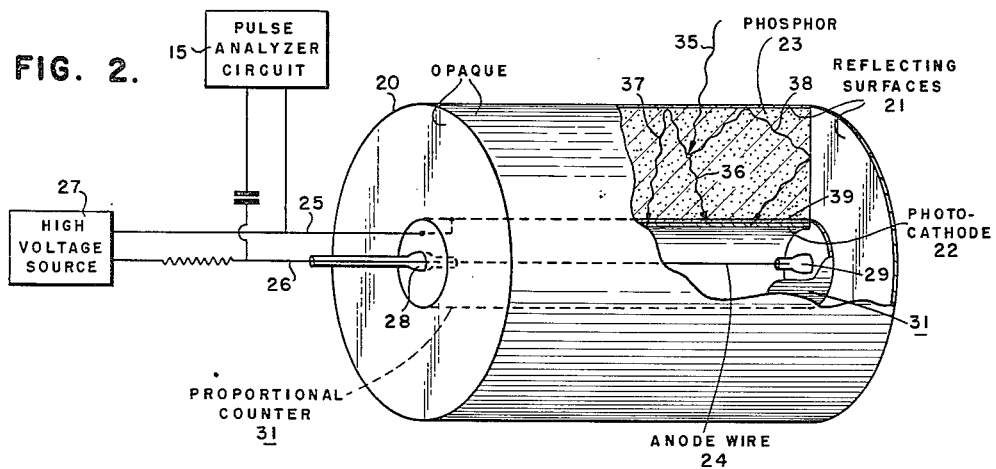
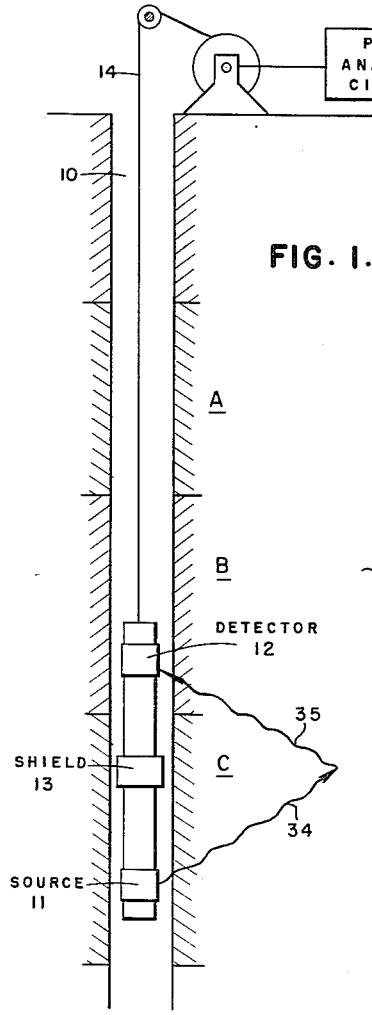
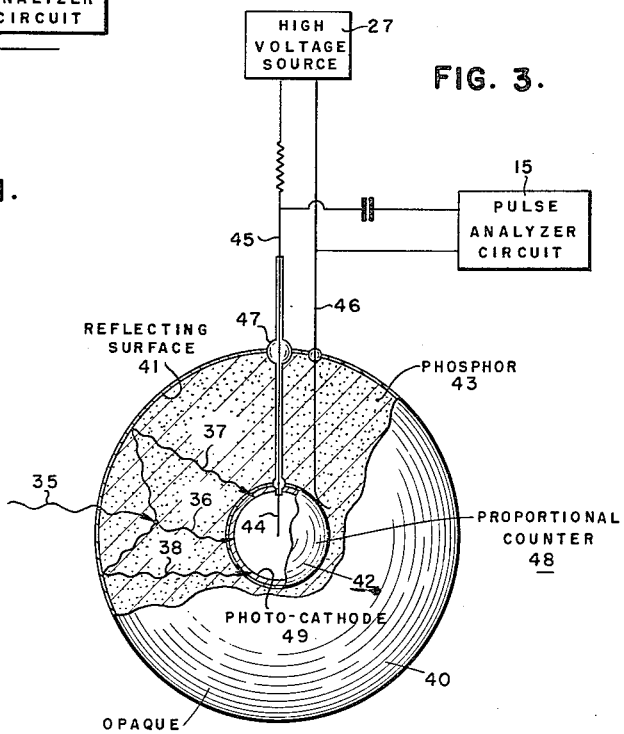
INVENTOR.
HEZZIE R. BRANNON JR
BY
ATTORNEY.

United States Patent Office 3,090,866
Patented May 21, 1963

3,090,866
SPECTROMETER
Hezzie R. Brannon, Jr., Bellaire, Tex., assignor, by mesne assignments, to Jersey Production Research Company, Tulsa, Okla., a corporation of Delaware
Filed June 3, 1957, Ser. No. 663,023
3 Claims. (Cl. 250—71.5)

This invention is directed to a spectrometer utilizing a combined scintillation-proportional counter.

The effectiveness of scintillation counters for use in the detection and measurement of radioactivity is based upon a rather high detection efficiency and upon a linear response to radiation energy absorbed by the scintillator. However, because of the size limitation imposed by conventional photomultiplier tubes employed in conjunction with the luminophor in present scintillation counters, two major disadvantages result. These disadvantages are: (1) distribution of pulse heights due to the several modes of gamma ray interaction with the scintillation material and (2) lack of useful efficiency for large sample counting. Attempts have been made to overcome these difficulties through the use of large volume liquid scintillators provided with a number of photomultipliers arranged around the liquid to provide reasonably efficient light collection. However, additional difficulties arise from such arrangements caused by the operation of a multiplicity of photo tubes.

Briefly, the invention comprises a large volume luminophor adapted to effect essentially total absorption of the energy of incoming radiation and a photosensitive proportional counter adapted to detect the luminescence produced by the scintillator. By virtue of the linear response of the luminophor an amount of luminescence proportional to the incoming gamma ray energy is produced; that is, a one-to-one correspondence of amount of luminescence and radiation energy is obtained as opposed to the spectrum generated by a conventional detector for a single energy. An electrical pulse of height proportional to the light from the luminophor is produced by the proportional counter thus preserving the linearity of the system. The electrical pulses produced are analyzed by conventional apparatus.

The luminophor material, commonly referred to as a phosphor, may be a solid crystal, a liquid, or a gas. This material which may be suitably sodium iodide thallium activated, anthracene, stilbene, terephenyl, etc. is capable of translating short wave length radiation into longer wave length radiation, which latter radiation is referred to herein as light or luminescence detectable by the photosensitive proportional counter.

An object of this invention, therefore, is to provide apparatus to obtain highly efficient radiation spectrometry utilizing the principles of scintillation and proportional counting. Additional objects of the invention will be apparent from the description of the invention taken in conjunction with the drawings wherein:

FIG. 1 is a schematic illustration of a radiation logging tool suspended in a borehole;

FIG. 2 illustrates one embodiment of the improved detector and electrical circuit connected thereto; and FIG. 3 illustrates another embodiment of the improved detector including the electrical circuit employed therewith.

The scintillation-proportional counter to be described herein is especially useful in well logging operations. For example, the counter may be used as the radiation detector in the methods of well logging described in U.S. patent applications Serial Nos. 504,825 and 534,234, respectively, filed April 29, 1955, now Patent No. 2,963,587 and September 14, 1955, now abandoned, respectively, entitled "Method of Well Logging" and "Radioactive Logging Method," respectively, by James A. Rickard and in U.S. patent application Serial No. 652,801, filed April 15, 1957, now abandoned, entitled "Method of Nuclear Borehole Logging" by Hezzie R. Brannon, Jr. and Nils L. Muench.

Also, the counter is particularly useful in laboratory observations of radiation resulting from nuclear reactions.

Referring more particularly to the drawings:

FIG. 1 shows a borehole 10 penetrating a plurality of subsurface formations A, B, and C. A radiation logging tool including a source of primary radiation 11, a gamma radiation detector 12 and a shield 13 are shown suspended on an electrically conductive cable 14, which is adapted to raise and lower the logging tool in the borehole and to transmit electrical signals produced in the detector to the earth's surface. Thus, the logging tool is raised or lowered in the borehole 10 and as the formations A, B, and C are traversed by the logging tool, the source of radiation 11 bombards these formations as indicated by arrowed line 34. The detector 12 detects the induced radiation as indicated by arrowed line 35 and translates the energy and intensity of the induced radiation into electrical pulses proportional thereto which pulses are transmitted to a pulse analyzer circuit 15 via conducting cable 14. The shield 13 is employed to insure that the detector 12 does not detect direct radiation emitted by source 11. Thus, the detector 12 does not detect radiation emitted directly from the source 11 and instead only detects induced secondary radiation.

The pulse analyzer circuit 15 may include an amplifier, a pulse height analyzer, a scaling circuit, a register, etc., which are adapted to analyze electrical signals that are characteristic of the detected radiation. This apparatus is conventional in character and well known in the art. Therefore, a detailed description thereof is not considered necessary.

In FIG. 2 is shown a cylindrical container 20 having light reflecting surfaces or coatings 21 formed on the interior surface thereof. A proportional counter 31 is arranged within container 20 and includes a cylindrically configured transparent counter wall 39 extending the length of container 20 along the axis thereof; a photocathode 22 (semi-transparent of the type used in photomultiplier tubes) arranged on the interior surface of counter wall 39; an electrode or anode wire 24 arranged within photocathode 22 and extending the length thereof; and an ionizable gas contained within the cylindrical photocathode 22. The ionizable gas may be suitably methane, a mixture of argon and 5 to 10 percent carbon dioxide, etc. A suitable phosphor 23 surrounds the counter wall 39 and fills the space between the exterior surface of counter wall 39 and the interior surface of cylinder 20. Leads 25 and 26 are connected to photocathode 22 and to anode 24, respectively. These leads are connected to a source of high voltage 27 and the pulse analyzer circuit 15, as shown. The anode 24 and lead 26 connection is suitably insulated as indicated at 28 and the electrode 24 is also insulated as at 29 where electrode 24 connects to one end of the proportional counter 31.

In operation, with reference to the embodiment of FIG. 2, radiation, such as gamma radiation, indicated at 35 induced by primary radiation penetrates cylinder 20 and phosphor material 23 contained therein. Each gamma ray (or other radiation capable of interacting with the phosphor) produces an amount of luminescence that is proportional to the gamma ray energy. This luminescence, such as indicated by rays 36, 37, and 38, is transmitted through the phosphor material 23 directly or by reflection from the surfaces 21, as shown, and the transparent wall 39 of the photosensitive proportional counter 31. After passage through the counter wall 39, the luminescence impinges on the photocathode 22 and causes photoelectrons to be ejected from the photocathode. These photoelectrons, having been ejected into the sensitive volume of the proportional counter initiate action of the proportional counter and produce electrical signals as in the known manner of proportional counters. Briefly, the electrons migrate towards the anode under the influence of the electric field established by the high voltage from the supply 27 being applied to the counter. On reaching the proximity of the anode wire 24, the electric field is sufficiently high to impart enough energy to the electrons between collisions with the counter filling gas molecules to cause ionization of the gas and hence, multiplication of the number of electrons moving to the anode. The size of the electrical pulse is determined by the number of electrons collected by the anode wire so that if linearity in the relationship of electrical pulse height and radiation energy absorbed by the phosphor is to be maintained, it is necessary that the gas multiplication remain in a controlled state, i.e., a full discharge as occurs in a Geiger counter must not develop. Gas multiplication is controlled through control of the magnitude of the high voltage applied to the counter. The size or height of the electrical pulse from the proportional counter is essentially proportional to the amount of luminescence caused by the particle detected.

The thickness or radial extent of the scintillating material or phosphor 23 is such that essentially total absorption of the energy of the gamma radiation is effected. Therefore, the one-to-one correspondence of luminescence and radiation energy causes the height of the electrical pulse to have one-to-one correspondence with the gamma radiation. The electrical pulse produced is analyzed in the pulse analyzer circuit 15.

In FIG. 3 a spherical embodiment of the device is shown in contradistinction to the cylindrical embodiment of FIG. 2. Thus, as shown in FIG. 3, a spherically configured container 40 is coated on the interior surface 41 thereof to provide a light reflecting surface. A proportional counter 48 is arranged within container 40 and includes a spherically configured transparent counter wall 42 arranged at the center of container 40; a semi-transparent photocathode 49 arranged on the interior surface of counter wall 42; an anode wire 44 extending into the space surrounded by photocathode 49; and an ionizable gas filling this space. A suitable phosphor 43 surrounds proportional counter 48 and extends to the interior surface of container 40. The anode wire 44 and the photocathode 49 are connected to leads 45 and 46, respectively. Lead 45 is suitably insulated by means of insulator 47 which extends through the phosphor 43 and connects to anode wire 44. The lead 46 extends through the phosphor 43 to the surface of the photocathode 49. The leads 45 and 46 are connected to a high voltage source 27 and a pulse analyzer circuit 15 similarly as in the pulse analyzer circuit and high voltage source of FIG. 2.

The operation of the FIG. 3 embodiment is the same as the operation of the FIG. 2 embodiment described supra. Briefly, a gamma ray 35 penetrates phosphor 43 producing an amount of luminescence indicated by rays 36, 37, and 38. This luminescence is transmitted through transparent counter wall 42 of the photosensitive proportional counter 48. The luminescence impinges on photocathode 49 causing photoelectrons to be ejected into the sensitive volume of the proportional counter to initiate action thereof and thereby producing electrical signals which are analyzed by pulse analyzer circuit 15, as described with relation to FIG. 2.

Although particular geometries are disclosed in FIGS. 2 and 3, other geometries are possible; therefore, the scope of the invention is not to be considered limited to the specific construction disclosed.

The type of spectrometer has been described herein relative to well logging operations, however the invention encompasses other radioactivity measurement operations where large volume counters capable of improved resolution are desired. A full order of magnitude and higher counting rates is attainable over present counters with the device of the present invention.

An improved energy resolution for radiation is inherent in the use of the large volume scintillation counter because a more complete absorption of radiation is obtained whatever the reactions involved.

Having fully described the elements, nature, operation and objects of my invention, I claim:

1. A gamma ray spectrometer for use in well logging adapted to obtain a spectral analysis of the energies of gamma rays emanating into a borehole from subsurface formations comprising a large volume scintillator for intercepting and absorbing the total energy of gamma rays emanating from large volumes of the subsurface formations surrounding the borehole and producing light pulses of intensities linearly related to the energies of the intercepted gamma rays, a light sensitive proportional counter light coupled to said scintillator for detecting said light pulses and producing electrical pulses having amplitudes linearly related to the intensities of said light pulses and therefore linearly related to the energies of the intercepted gamma rays, means for transmitting said electrical pulses to the earth's surface, a pulse height analyzer for analyzing said electrical pulses transmitted to the earth's surface and a recorder for recording the output of said pulse height analyzer to display a spectrum of pulses whose heights are linearly related to the energies of the gamma rays intercepted by the large volume scintillator.

2. A spectrometer as recited in claim 1 wherein said scintillator is cylindrically configured.

3. A spectrometer as recited in claim 1 wherein said scintillator is spherically configured.

References Cited in the file of this patent

UNITED STATES PATENTS

| | | |
|---|---|---|
| Re. 24,226 | Fearon | Oct. 9, 1956 |
| 2,534,922 | Marshall | Dec. 19, 1950 |
| 2,617,955 | Manderville et al. | Nov. 11, 1952 |
| 2,648,012 | Scherbatskoy | Aug. 4, 1953 |
| 2,686,266 | Pringle | Aug. 10, 1954 |
| 2,686,268 | Martin | Aug. 10, 1954 |
| 2,694,152 | Teichman | Nov. 9, 1954 |
| 2,714,169 | Armistead | July 26, 1955 |
| 2,721,943 | Armistead | Oct. 25, 1955 |
| 2,828,423 | Scherbatskoy | Mar. 25, 1958 |

OTHER REFERENCES

MDDC 188, Spherical Proportional Counter, USAEC Document, pages 1 to 5, declassified Aug. 8, 1946.